United States Patent [19]
Lane et al.

[11] Patent Number: 5,653,101
[45] Date of Patent: Aug. 5, 1997

[54] METHOD FOR TREATING AN EXHAUST GAS STREAM FOR THE REMOVAL ON NOX

[75] Inventors: William H. Lane, Chillicothe; Randy N. Peterson, Edelstein; Aaron L. Smith, East Peoria, all of Ill.

[73] Assignee: Caterpillar Inc., Peoria, Ill.

[21] Appl. No.: 492,275

[22] Filed: Jun. 19, 1995

[51] Int. Cl.$^6$ ........................................ F01N 3/20
[52] U.S. Cl. ..................... 60/274; 60/280; 60/301; 60/303
[58] Field of Search .............. 60/274, 280, 301, 60/303

[56] References Cited

U.S. PATENT DOCUMENTS

| | | | |
|---|---|---|---|
| 2,674,521 | 4/1954 | Houdry | 60/280 |
| 3,303,993 | 2/1967 | Andrews | 60/280 |
| 3,775,971 | 12/1973 | Gadefelt | 60/280 |
| 4,122,673 | 10/1978 | Leins | 60/280 |

FOREIGN PATENT DOCUMENTS

| | | | |
|---|---|---|---|
| 44324 | 4/1977 | Japan | 60/280 |
| 3229911 | 10/1991 | Japan | 60/280 |

*Primary Examiner*—Douglas Hart
*Attorney, Agent, or Firm*—Robert J. Hampsch; Frank L. Hart

[57] ABSTRACT

A method for treating exhaust gas stream of an engine for the removal of NOx by mixing a NOx reducing fluid and air together with the exhaust gas and subsequently cooling the treated exhaust gas stream prior to contact with the deNOx catalyst.

7 Claims, 2 Drawing Sheets

METHOD FOR TREATING AN EXHAUST GAS STREAM FOR THE REMOVAL ON NOX

DESCRIPTION

1. Technical Field

The present invention relates to the treating of an exhaust gas stream of an engine for the removal of NOx from the stream.

2. Background Art

Due primarily to federal regulations, engine manufacturers are being forced to reduce the amount of harmful compounds in the combustion exhaust. In the case of lean burning engines, such as diesel engines for example, a hydrocarbon (HC) species must often be injected into the exhaust stream to effectively reduce the NOx concentrations. In other words, in combustion exhaust purification or treating systems having an oxygen environment above 3% concentration, some type of reducing fluid, usually a hydrocarbon compound, must be introduced into the exhaust stream in order to achieve acceptable reduction levels of NOx compounds.

There have been several inventions for so controlling the NOx content in the gas stream, but most have one or more deficiencies which lower the effectiveness and/or efficiency of the treating process.

The present invention is directed to overcome one or more of the problems as set forth above.

DISCLOSURE OF THE INVENTION

In one aspect of the invention, a method is provided for treating the exhaust gas stream of an engine for the removal of NOx from the gas stream. A preselected amount of NOx reducing fluid is mixed with air for forming a resultant NOx fluid. The NOx fluid is then mixed into the exhaust gas stream at a preselected location upstream of a turbocharger of the engine. Such mixing forms a resultant treated exhaust gas stream. The treated exhaust gas stream is thereafter cooled in a turbocharger resulting in the forming of a cooled, treated exhaust gas stream. The cooled, treated exhaust gas stream is thereafter passed into contact with a deNOx catalyst.

BEST MODE FOR CARRYING OUT THE INVENTION

Figure 1:
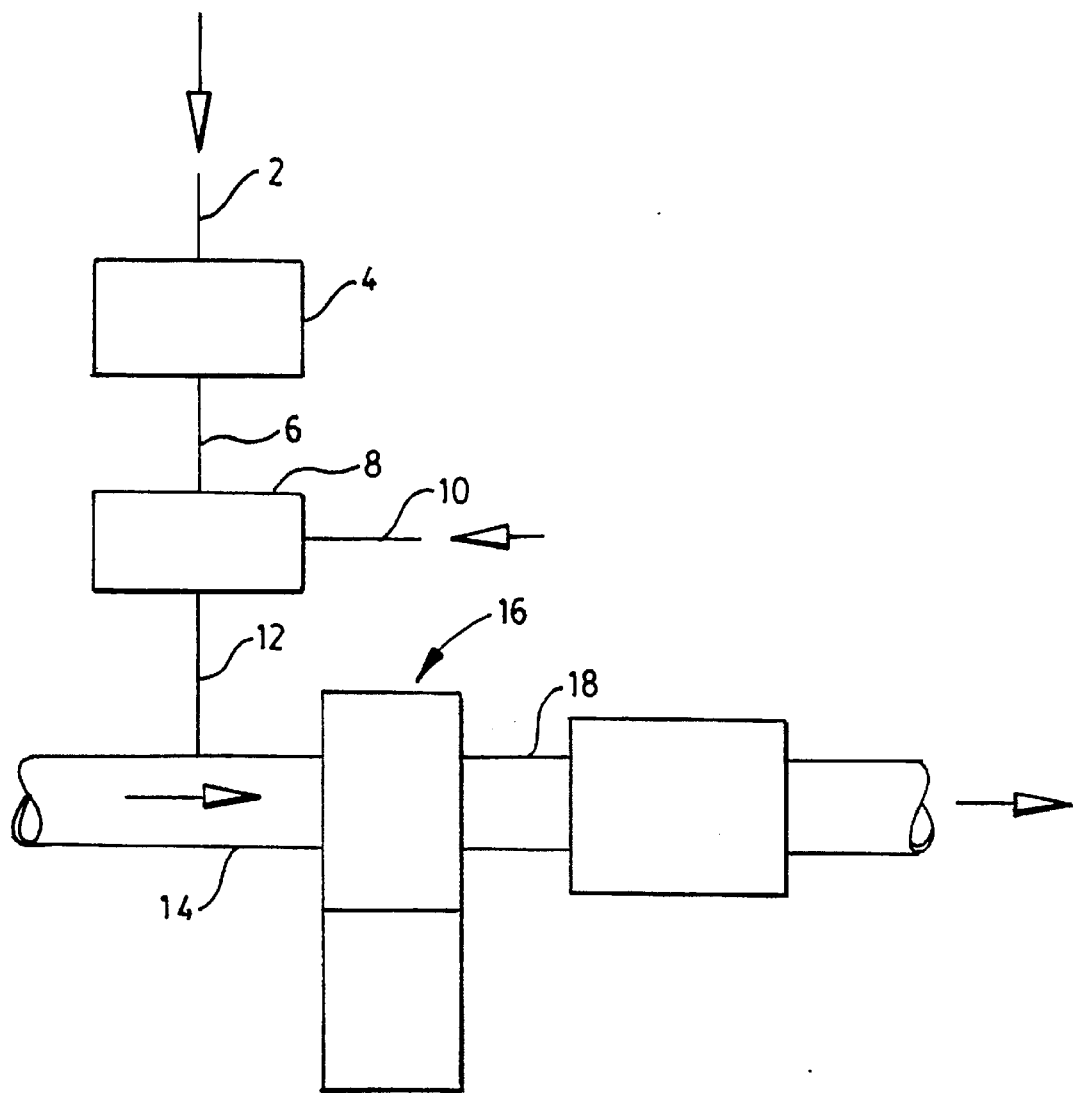
FIG. 1 is a diagrammatic partial view of the apparatus used in the practice of this invention and FIG. 2 is an enlarged view of a portion of the apparatus of FIG. 1.

Referring to FIG. 1, a reducing fluid supply (not shown) delivers reducing fluid via line 2 to a fluid meter 4. The fluid meter 4 regulates the amount of reducing fluid delivered from the reducing fluid supply and injects the measured reducing fluid via line 6 into a mixing apparatus 8 at which the reducing fluid is mixed with air delivered thereto via line 10. The reducing fluid and air mixture forms a resultant NOx fluid that is delivered via line 12 into an exhaust gas stream that is passing through exhaust line 14.

Figure 2:
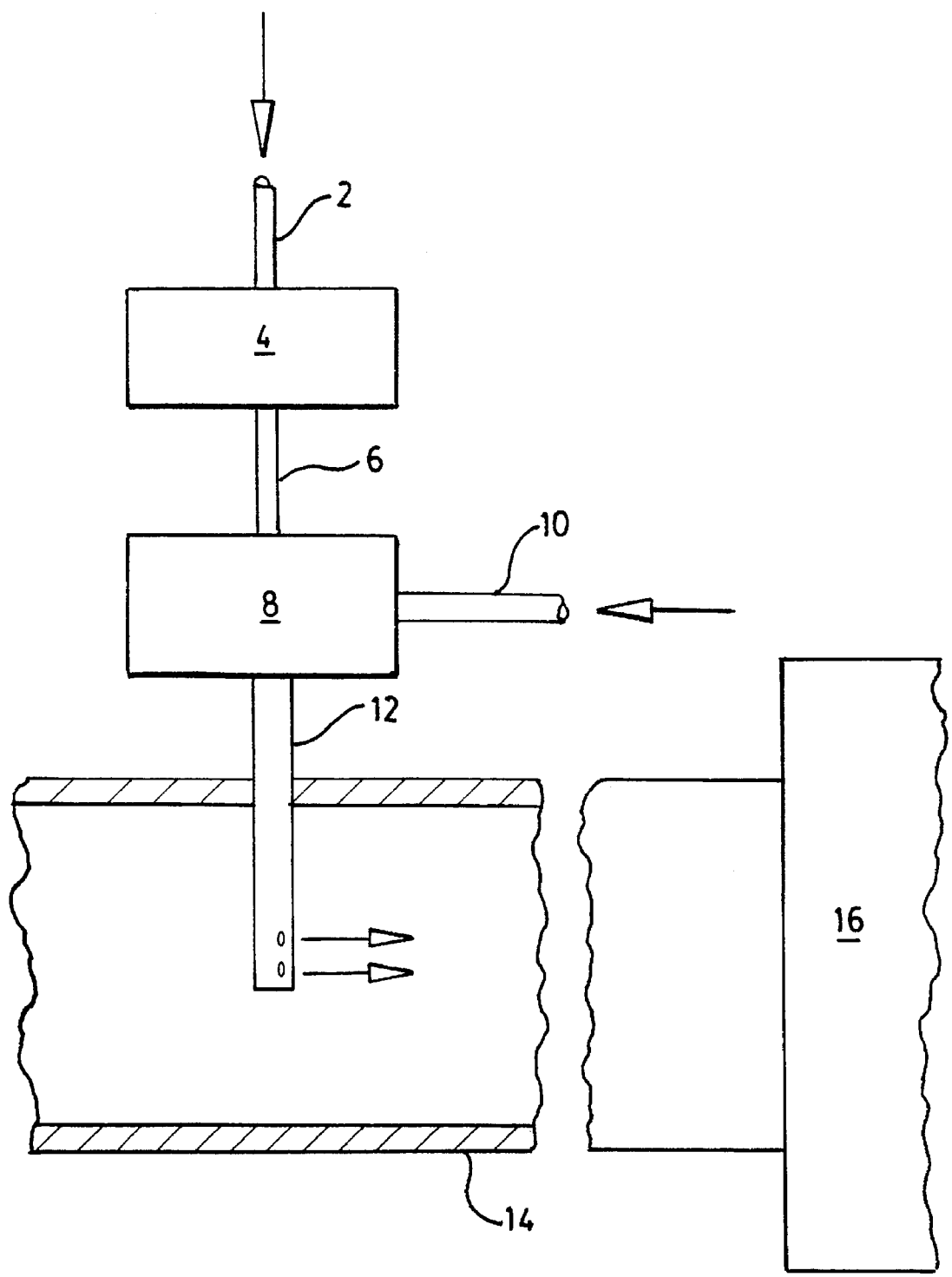

Referring to FIGS. 1 and 2, the NOx fluid is discharged from line 12 preferably as a spray with the spray oriented in the direction of flow of the exhaust gas stream in exhaust line 14. It is also preferred that the NOx fluid spray enters the exhaust gas stream at a location about the longitudinal axis of the exhaust line 14 in order to increase the efficiency of the NOx fluid spray mixing with the exhaust gas stream and forming a resultant treated exhaust gas stream. The efficiency of thorough mixing of the NOx fluid spray with the exhaust gas stream has been found to be greatly improved by injecting the NOx fluid spray into the exhaust gas stream at a location upstream of a turbocharger 16 of the engine.

The treated exhaust gas stream is thereafter passed through the turbocharger 16 where it is cooled and is further mixed and discharged via line 18 (FIG. 1) to and into contact with a deNOx catalyst 20 where the cooled, treated exhaust gas stream reacts with the catalyst 20 for the removal of undesirable NOx content.

In the method of this invention, particularly where the engine is a diesel engine, the preferred NOx reducing fluid is ethanol which is injected into the exhaust gas stream at a rate of about 1% to about 5% by weight of engine fuel consumption per unit time. Volumes of NOx reducing fluid less than about 1% are undesirable because the exhaust gas will not be sufficiently treated for the removal of desirable amounts of NOx and at greater than about 5% there will be a waste of natural resources which likewise is undesirable. It should be understood, however, that NOx reducing fluids and catalyst used therewith for deNOx treatment of exhaust gas are well known in the art and other NOx reducing fluids and their associated catalyst can be used without departing from this invention.

The NOx reducing fluid is preferably continuously mixed with the exhaust gas stream. However, the NOx reducing fluid can be intermittently injected into the mixing chamber 8 without departing from this invention. However, when intermittent injection of NOx reducing fluid is practiced, it is preferred that the air stream be continuously injected into the exhaust line 14 via line 12 in order to assure maintaining the fluid spray openings of line 12 in an open condition and avoid clogging of these openings.

In the preferred method of this invention, the treated exhaust gas is cooled as it passes through the turbocharger 16 to a temperature decrease greater than about 100 degrees C. Preferably, the temperature of the treated exhaust gas is decreased in the range of about 100 to about 150 degrees C., as it passes through the turbocharger 16.

INDUSTRIAL APPLICABILITY

By so pretreating the exhaust gas before contact with the catalyst, the efficiency of undesirable contaminant removal by the catalyst is markedly increased. This increase in efficiency and effectiveness is generated by improved mixing in the turbocharger and temperature decrease of the treated exhaust gas stream as it passes through the turbocharger 16 which in turn increases the working temperature range of the catalyst bed. Since the injector is located in a hot, hostile environment, the introduction of air and mixing of the air with the NOx reducing fluid provides sufficient cooling to assist in avoiding equipment damage.

Other aspects, objects and advantages of this invention can be obtained from a study of the drawings, the disclosure and the appended claims.

We claim:

1. A method for treating an exhaust gas stream of an engine for the removal of NOx therefrom, comprising:

mixing a preselected amount of NOx reducing fluid with air and forming a resultant NOx fluid;

mixing the NOx fluid into the exhaust gas stream at a preselected location upstream of a turbocharger of the engine and forming a resultant treated exhaust gas stream;

cooling the treated exhaust gas stream in the turbocharger and forming a cooled, treated exhaust gas stream; and passing the cooled, treated exhaust gas stream into contact with a deNOx catalyst.

2. A method, as set forth in claim 1, including spraying the NOx fluid into the exhaust gas stream, said NOx fluid spray being oriented in the direction of flow of the exhaust gas stream.

3. A method, as set forth in claim 1, wherein the NOx reducing fluid is ethanol.

4. A method, as set forth in claim 1, including mixing the NOx reducing fluid into the exhaust gas stream at a volume in the ratio of about 1 to about 5% by weight of engine fuel consumption per unit time.

5. A method, as set forth in claim 1, including decreasing the temperature of the treated exhaust gas stream in the range of about 100 to about 150 degrees C.

6. A method, as set forth in claim 1, including continuously mixing the NOx fluid into the exhaust gas stream.

7. A method, as set forth in claim 1, including continuously passing air into the exhaust gas stream and intermittently mixing NOx reducing fluid with the air and forming the resultant NOx fluid.

* * * * *